Oct. 12, 1926.
J. E. McDADE
1,603,129
OUTLINING DEVICE
Filed Feb. 5, 1926
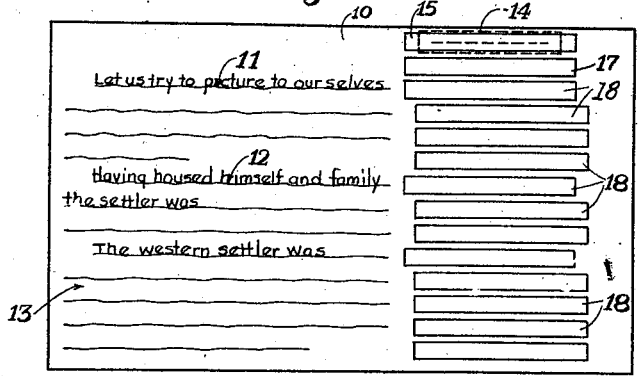
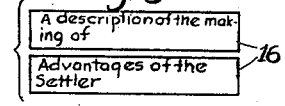
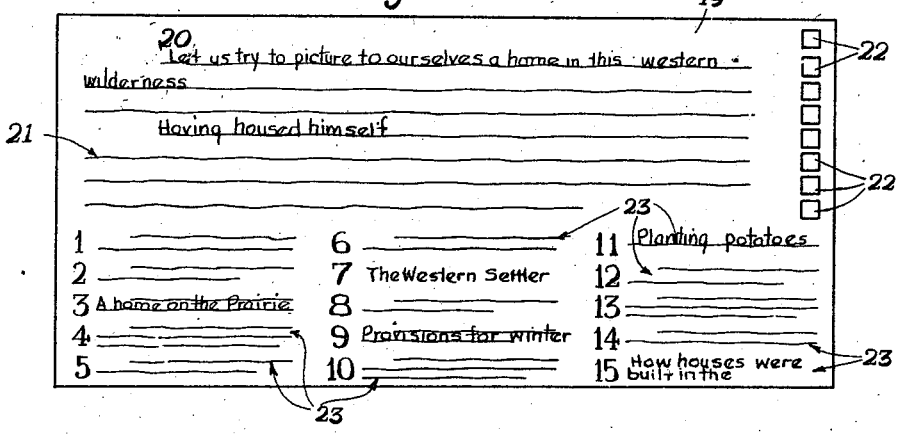
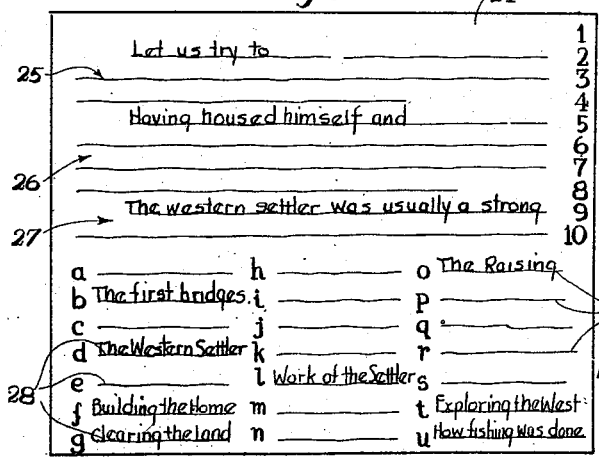
INVENTOR,—
James E. McDade
BY
Trice & DeBusk
ATTORNEYS.

Patented Oct. 12, 1926.

1,603,129

UNITED STATES PATENT OFFICE.

JAMES E. McDADE, OF CHICAGO, ILLINOIS.

OUTLINING DEVICE.

Application filed February 5, 1926. Serial No. 86,150.

My invention relates to outlining devices particularly designed for use by young pupils for developing in them the habit of reading carefully and analyzing as they read. It has been determined that it is not the most careful reader, nor the most attentive reader, nor the reader with the best memory or the most brilliant intellect who gets the most out of his reading. All such features are important, but it is much more important that the reader weigh the matter as he reads it and differentiate between what is of prime importance as the essence of the subject matter and what is of secondary importance or of no importance at all. It has been established that, when a student of only fair ability sifts out matters of importance forming a comparatively small proportion of the entire matter read and concentrates upon the memorization of such small proportion, he can retain permanently and effectively much more than can the more brilliant student who does not analyze and eliminate.

It is the object of my invention to provide means by the use of which attentive and analytical reading and study may be encouraged and in the use of which an instructor may readily determine whether or not such effective reading and study are being done. It is another object of my invention to provide a device of this kind involving a series of more or less similar outline notes one of which is more aptly applicable to a certain portion of the reading matter than is any one of the others, whereby the pupil gains the benefit to be derived from the selection of the proper note from the several notes without necessarily taking his time for the formulation of such notes. It is still another object of my invention to provide in one embodiment of the invention a plurality of cards bearing thereon the several notes so that the pupil can handle the cards and segregate them or associate them as desired for close comparison and can then place the selected card bodily in the desired position opposite the portion of the reading matter to which it is applicable.

It is another object of my invention to improve devices of this type in sundry details hereinafter pointed out. The preferred means by which I have accomplished my several objects are illustrated more or less diagrammatically in the drawing and are hereinafter specifically described. That which I believe to be new and desire to cover by Letters Patent is set for in the claims.

In the drawing—

Fig. 1 is a face view of a card provided with reading matter to be outlined and embodying a portion of the subject matter of the preferred form of my invention.

Fig. 2 is a face view of a plurality of title cards to be used in connection with the card of Fig. 1.

Fig. 3 is a face view of a plurality of outline cards also to be used in connection with the card of Fig. 1.

Fig. 4 is a face view of a card provided with reading matter to be outlined and with a plurality of title and outline notes, together with an arrangement of means for designating on the card the application of the notes to the subject matter.

Fig. 5 is a face view of a card provided with reading matter to be outlined and with a plurality of title and outline notes, the several notes and the several lines of the reading matter being provided with reference characters forming a part of the device; and Fig. 6 is a face view of a separate card, partly broken away, for use for indicating the correspondence of the several lines and the several notes as shown on the card of Fig. 5.

Referring now to Figs. 1, 2 and 3, which illustrate diagrammatically an embodiment of a preferred form of my invention,—10 indicates a card having printed thereon a story or other piece of reading matter comprising three paragraphs 11, 12 and 13.

Smaller cards 14 as shown in Fig. 2 are provided with titles all of which relate to subject matter more or less similar to that of the reading matter on the card 10, but one of which titles relates directly to the particular subject matter more fully and aptly than any of the others. In the use of the device, the pupil is to study the reading matter on the card 10 and is to select from the several small cards 14 the particular one most aptly applicable and is to place such card in position upon the space 15 as indicated by the dotted line showing in Fig. 1.

Other small cards 16 as shown in Fig. 3 are provided, some of which are provided with outline notes of a type suitable for indicating the theme of the reading matter as a whole, the most aptly applicable of which theme cards is to be placed in position upon the space 17 of the card 10. Upon the opposite faces of the cards 16, or upon the faces of other cards 16, I provide outline notes of a type suitable for indicating the subject matter of paragraphs such as paragraphs 11, 12 and 13, the particular cards properly applicable, as distinguished from those relating to only generally similar subject matter, to be selected and placed in proper sequence opposite the particular paragraphs or parts of paragraphs to which they relate, a plurality of spaces 18 being defined for the reception of the cards upon the card 10, as indicated in Fig. 1.

Any form of reading matter may be employed such for example as the following three paragraphs,—

Let us try to picture to ourselves a home in this western wilderness. After the settler had reached his destination and had purchased a tract of land or had taken possession of it without purchase, as was often the case, he proceeded to build his home. He cut the trees away from a small piece of ground and selected some of the best and straightest of the timber for his log hut. After getting the logs ready with his axe, he had what was called a "raising,"— that is, he gathered together a few neighbors, if such could be found, and with their help, he put his cabin together. The only pay which his helpers received was the prospect of being assisted in a similar way at some future time. The early settlers usually had a jolly time at these raisings and often indulged to excess in strong drink.

Having housed himself and family, the settler was then ready to make preparations for cultivating the soil. The trees around the cabin were killed by girdling, and corn and other vegetables were planted. At a later time when he wished to clear off the land more rapidly he cut down the trees, trimmed away the limbs, and then chopped up the trunks into logs of convenient lengths. Some of these logs were split into rails for fences, but most of them were rolled up into piles and burned. For this purpose the pioneer again called his neighbors together and a jolly "log-rolling" was the result.

The western settler was usually a strong, self-reliant character, but in some cases he was shiftless and lazy. He sometimes preferred hunting, fishing, or trapping to the more serious business of farming. He had few opportunities for education, religious development, or refinement of any kind, although log schoolhouses were constructed here and there at an early time, and the circuit-riding minister soon appeared.

The title cards 14 from which selection is to be made for the reading matter as above presented may be as follows,—
 Building the village.
 Exploring the West.
 The Western settler.
 The log rolling.
 A home on the prairie.

Of these five titles, all but one can be eliminated as being only partially applicable to the reading matter or as being representative of only a part of the subject matter. The title "The western settler" is seen to be aptly applicable and representative.

Theme cards might be used as follows,—
 The adventures of an explorer seeking to find new lands, and bring back a description of them.
 How houses were built in the early days on the open prairies of the West.
 A description of the making of a home in the forest wilderness of the West.
 How the early settlers began the building of a small village in the far West.

Of these four theme cards, the third is seen to be the one peculiarly representative of the situation described, and the card bearing such subject matter should accordingly be placed in position upon the space 17.

For the outlining of the three paragraphs of the subject matter, the following are presented as being applicable, four cards for each paragraph. For the first paragraph,—
 Building the home:
  Obtaining the land.
  Materials for building.
  The raising.
For the second paragraph,—
 Cultivating the soil:
  Clearing the land.
  The first planting.
  The log rolling.
For the third paragraph,—
 The settler:
  Character of the settler.
  Work of the settler.
  Advantages of the settler.

Other cards not so fully applicable as those above set forth but applicable to more or less closely related subject matter, or applicable to situations of the same general type with respect to features not included in the reading matter, might be provided as follows,—
 Planting potatoes.
 How fishing was done.
 Animals in the forest.
 How the children helped.
 The kinds of trees.
 The first bridges.
 Danger from Indians.
 Going down the river.

Clothing of the settler.
The importance of fire.
Resourcefulness of the settler.
Provisions for the winter.

Inasmuch as all of the cards 16 are preferably to be of the same size, color and other conditions, it will be appreciated that the pupil must study the reading matter carefully in order to enable him by elimination and selection to apply the cards properly upon the spaces 15, 17 and 18.

In the form of device as shown in Fig. 4, a single card 19 contains the entire combination of features, comprising two paragraphs 20 and 21 of a story or other reading matter, with squares 22 provided opposite the place for the title and at various other points opposite the reading matter. Below the story, in the form illustrated, a plurality of items or notes 23 in outline form are provided, each with a reference numeral by which it is designated. As in the device above described, some of the notes are to be aptly applicable and the others are to be susceptible of differentiation from the subject matter by some feature or another. In the use of the device, the pupil is to select the proper items and write into the squares 22 the corresponding numerals.

In the form of device as shown in Figs. 5 and 6, a card 24 is provided with reading matter comprising three paragraphs 25, 26 and 27, with notations 28 in outline form at the bottom of the card, each designated by a reference letter. The several lines of the reading matter are also designated by reference numerals in order. In the use of the device, a pupil selects the proper items from the list at the bottom of the page and indicates on a separate card 29 his selection of the outline notes applicable.

In the use of the device of Figs. 1, 2 and 3, the cards representing the several outline notes can be handled and sorted for facilitating the elimination of the inapplicable items. Moreover, two cards bearing notations which are apparently very similar can be placed side by side for close study and comparison for final determination as to which is properly applicable and which is not. In the use of the form shown in Fig. 4 and in Figs. 5 and 6, it is not necessary that the work be done in the presence of the instructor, inasmuch as the results of the work are made of record so that the instructor can by a later examination determine the degree of success attained by the pupil. On the other hand the instructor can by an inspection of the completed work in connection with the device of Figs. 1, 2 and 3 tell almost at a glance whether or not the work is correct.

In case the reading matter is of considerable length so as to involve the use of a comparatively large number of outline cards, fairly satisfactory results may be obtained without the use of any notations which are not properly applicable to some portion of the reading matter. In such a case, the benefit to be derived by the pupil from his consideration of the several notations and the selection of the properly applicable notation is almost as great as would be the case if additional notations where provided. In any event, the notations applicable to one portion of the reading matter are surplus notations with respect to the other portions of the reading matter to which they do not apply.

While my invention is designed particularly for the teaching of reading, with the idea of teaching the pupil how to analyze as he reads and of establishing the habit of analytical reading, I wish to have it understood that I do not desire to be limited with respect to the nature of the reading matter. My invention may be practiced in connection with reading matter of the type set forth, where the principal advantage to be gained lies in the training, or it may be practiced in connection with reading matter of such a nature that it is desirable to have the pupil retain the facts themselves in his memory,—such as history, or the like.

By the use of the device as shown in Figs. 1, 2 and 3, the pupil has practice in the preparation of the outline and also becomes accustomed to the appearance and the use of the prepared outline, inasmuch as the several cards when placed have the usual formal outline arrangement. This is of particular importance for young pupils who are just learning methods of study and acquiring habits of memorization.

In the form of device as shown in Figs. 4 and 5, the notations may be arranged alphabetically or in any other arbitrary manner which comprises an indiscriminate arrangement to the extent that it does not indicate to the user the order in which the notations are to be applied.

I claim:—

1. In an outlining device, the combination of a piece of reading matter, outline notes applicable correctly to a portion of said reading matter, and other outline notes applicable to analogous subject matter, the several notes being arranged indiscriminately whereby the user is able only by consideration of the subject matter to make proper selection of the notes applicable to any particular part of said reading matter.

2. In an outlining device, the combination of a piece of reading matter, a set of outline notes applicable correctly to said subject matter, and a set of outline notes applicable to analogous subject matter, the notes of said two sets being arranged indiscriminately whereby the user is able only by consideration of the subject matter to make proper selection of the notes applicable to said reading matter.

3. In an outlining device, the combination of a piece of reading matter, a plurality of outline notes referring correctly to said subject matter, a plurality of similarly arranged notes referred to analogous subject matter, and means arranged for the application of said notes to said reading matter.

4. In an outlining device, the combination of a piece of reading matter, a plurality of outline notes referring correctly to said subject matter, a plurality of similarly arranged notes referring to analogous subject matter, and means for designating in connection with the piece of reading matter the applicability of the notes thereto.

5. In an outlining device, the combination of a piece of reading matter, a plurality of outline notes referring correctly to said subject matter, a plurality of similarly arranged notes referring to analogous subject matter, and means for designating the applicability of certain of the notes to certain definite portions of the reading matter.

6. In an outlining device, the combination of a page containing a piece of reading matter, a plurality of outline notes referring correctly to said subject matter, a plurality of similarly arranged notes referring to analogous subject matter, and means on the card opposite the subject matter at a plurality of points therealong for designating the applicability of the notes thereto.

7. In an outlining device, the combination of a page containing a piece of reading matter, a plurality of outline notes on said page referring correctly to said subject matter, a plurality of similarly arranged notes referring to analogous subject matter and mixed indiscriminately with the applicable notes, and means for designating the several notes and for indicating their applicability to the reading matter.

8. In an outlining device, the combination of a page containing a piece of reading matter, a plurality of outline notes on said page referring correctly to said subject matter, a plurality of similarly arranged notes referring to analogous subject matter and mixed indiscriminately with the applicable notes, means on the page opposite the several notes for designating such notes, and means for indicating the applicability of the notes to the reading matter.

9. In an outlining device, the combination of a page containing a piece of reading matter, a plurality of outline notes on said page referring correctly to said subject matter, a plurality of similarly arranged notes referring to analogous subject matter and mixed indiscriminately with the applicable notes, means on the page opposite the several notes for designating such notes, and means on the page for indicating the applicability of the notes to the reading matter.

10. In an outlining device, the combination of a page containing a piece of reading matter, a plurality of outline notes on said page referring correctly to a portion of said subject matter, a plurality of similarly arranged notes referring to analogous subject matter and mixed indiscriminately with the applicable notes, means on the page opposite the several notes for designating such notes, and means on the page at a plurality of points opposite the reading matter for indicating the applicability of the notes thereto.

11. In an outlining device, the combination of a page containing a piece of reading matter, a plurality of outline notes on said page referring correctly to said subject matter, a plurality of similarly arranged notes referring to analogous subject matter and mixed indiscriminately with the applicable notes, means for designating the several notes, means on the page at a plurality of points opposite the reading matter for designating the several points, and means for indicating the applicability of the notes to the reading matter.

12. In an outlining device, the combination of a page containing a piece of reading matter, a plurality of outline notes on said page referring correctly to a portion of said subject matter, a plurality of similarly arranged notes referring to analogous subject matter and mixed indiscriminately with the applicable notes, means for designating the several notes, and means on the page for designating the several lines of the reading matter for enabling the user to indicate the applicability of the notes to the reading matter.

13. In an outlining device, the combination of a piece of reading matter, a plurality of outline notes applicable correctly to a portion of said subject matter and carried respectively by separately formed cards, and a plurality of other outline notes applicable to analogous subject matter and carried respectively by cards so as to be capable of being mixed with said first named notes.

14. In an outlining device, the combination of a piece of reading matter, a plurality of outline notes applicable correctly to said subject matter and carried respectively by separately formed cards, and a plurality of other outline notes applicable to analogous subject matter and carried respectively by other cards similarly arranged so as to be capable of being mixed with said first named notes.

15. In an outlining device, the combination of a piece of reading matter, a plurality of outline notes applicable correctly to said subject matter and carried respectively by separately formed cards, and a plurality of other outline notes applicable to analogous subject matter and carried respectively by cards so as to be capable of being mixed with said first named notes, said cards having similarly arranged faces whereby the user is able only by consideration of the subject matter to select and apply the cards properly to said reading matter.

16. In an outlining device, the combination of a page containing a piece of reading matter, a plurality of outline notes referring correctly to said subject matter and arranged on cards, a plurality of other outline notes referring to analogous subject matter and arranged similarly on cards, and spaces marked on said page opposite the reading matter for receiving the cards applicable to the oppositely arranged reading matter.

JAMES E. McDADE.